Feb. 24, 1925.
J. W. BULLIS
1,527,834
PISTON RING
Filed Aug. 1, 1923
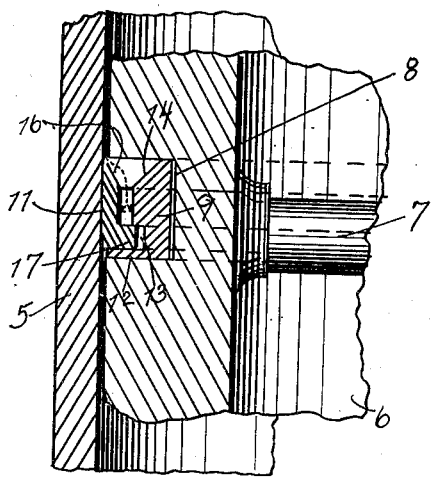
Fig. I.
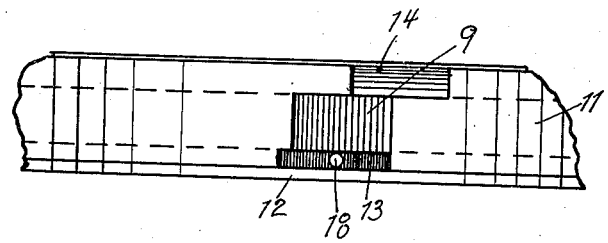
Fig. II.
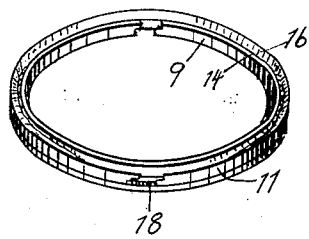
Fig. III.
INVENTOR.
JAMES. W. BULLIS
BY Victor J Evans
ATTORNEY Patented Feb. 24, 1925.

1,527,834

UNITED STATES PATENT OFFICE.

JAMES W. BULLIS, OF SANTA ROSA, CALIFORNIA.

PISTON RING.

Application filed August 1, 1923. Serial No. 655,101.

*To all whom it may concern:*

Be it known that I, JAMES W. BULLIS, a citizen of the United States, residing at Santa Rosa, in the county of Sonoma and State of California, have invented new and useful Improvements in Piston Rings, of which the following is a specification.

This invention relates to new and useful improvements in piston rings and has particular reference to a piston ring which will automatically expand due to pressure within the cylinder.

Another object is to provide a ring of this character which will also act as an efficient oil seal.

A still further object is to provide a ring which is cheap to manufacture and simple to install, also one which may be used in the average piston without altering the construction of the same.

Other objects and advantages will be apparent during the course of the following description.

In the accompanying drawings forming a part of this specification, and in which like numerals are employed to designate like parts throughout the same, Figure 1 is a fragmentary detail view of a section of a piston and cylinder wall showing my ring in use therewith.

Figure 2 is a fragmentary detail view showing the position of the end of the outer rings in respect to the inner ring.

Figure 3 is a perspective view of my ring.

Applicant is aware of the fact that double rings have been employed. These rings, however, have been plain rings with the result that they were little better than the average single ring. I have, therefore, sought to provide a ring having a feathered edge which will intimately contact the wall of the cylinder.

In the accompanying drawings wherein for the purpose of illustration is shown a preferred embodiment of my invention, the numeral 5 designates the cylinder wall, the numeral 6 the piston moving within the cylinder, the numeral 7 the usual wrist pin and 8 the usual ring groove.

The construction thus far described is identical with that common to all internal combustion engines.

Within the ring groove 8, I have positioned my ring which consists of two parts, an inner ring 9 and an outer ring 11. It will be noted that the inner ring has a base 12, immediately above which is formed a groove 13 and that the upper edge of this ring is chamfered as shown at 14. The outer ring 11 is also chamfered as shown at 16, and has a projecting portion 17 adapted to fit within the recess 13 of the ring 9. The ends of the inner ring are cut in the usual manner while the ends of the outer ring are stepped as shown at Figure 1, and a pin 18 is provided which pin prevents the two parts from rotating with respect to each other.

It will thus be seen that when the ring is employed in the position shown in Figure 1, the pressure above the piston, will contact the ring 11 and will exert pressure against the rings 9 and 11, as shown by dotted arrows in Figure 1, forcing the rings apart and against the piston and cylinder respectively.

When the ring is reversed, the chamfered edge 16 will serve to scrap the oil from the cylinder wall, thereby preventing the same from working to a point above the cylinder head and thus fouling the spark plug and valves.

It will thus be seen that I have provided a very simple structure which accomplishes the objects set forth.

It is to be understood that the form of my invention, herewith shown and described is to be taken as a preferred example of the same, and that various changes in the shape, size and arrangement of parts may be resorted to without departing from the spirit of the invention, or the scope of the subjoined claim.

Having thus described my invention, I claim:—

A piston ring comprising an inner ring, an outer ring, said inner ring having a groove formed therein, said outer ring having a base adapted to enter the groove in said inner ring, means for preventing rotation of said rings, with respect to each other and each of said rings having their upper margins chamfered, for the purpose specified.

In testimony whereof I affix my signature.

JAMES W. BULLIS.